Oct. 11, 1927.
S. H. PERKY
1,645,155
MACHINE FOR FORMING A FOOD PRODUCT
Filed July 11, 1922     3 Sheets-Sheet 1
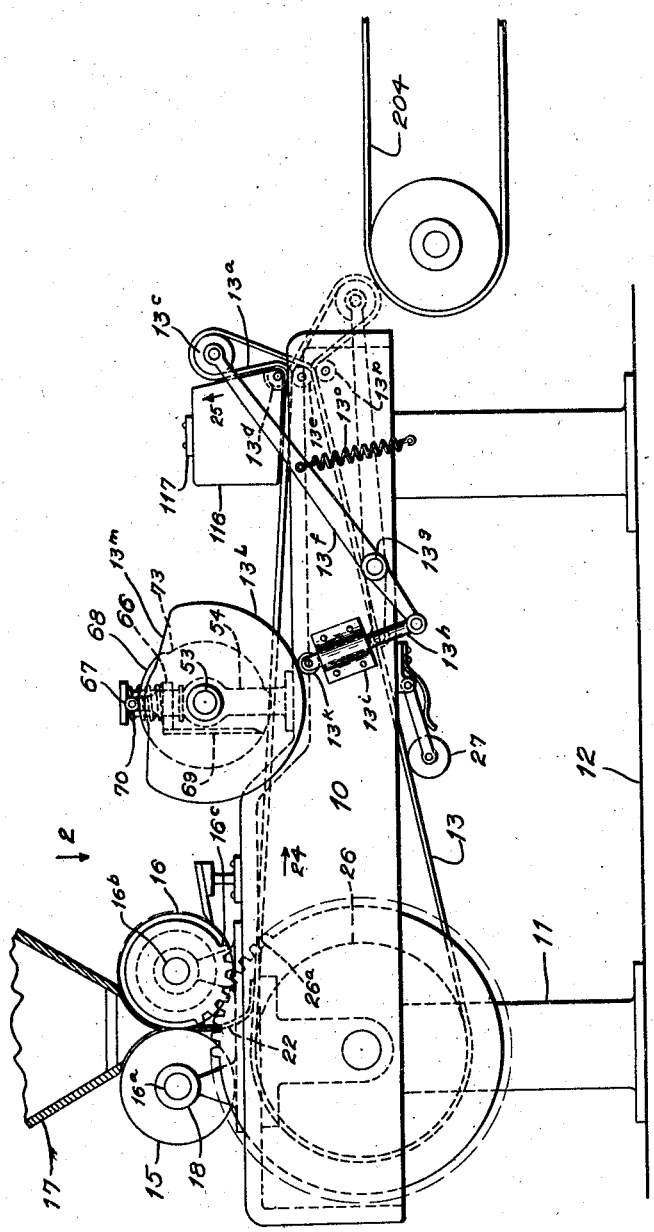
Inventor
Scott H. Perky
By John W. Darley
Attorney

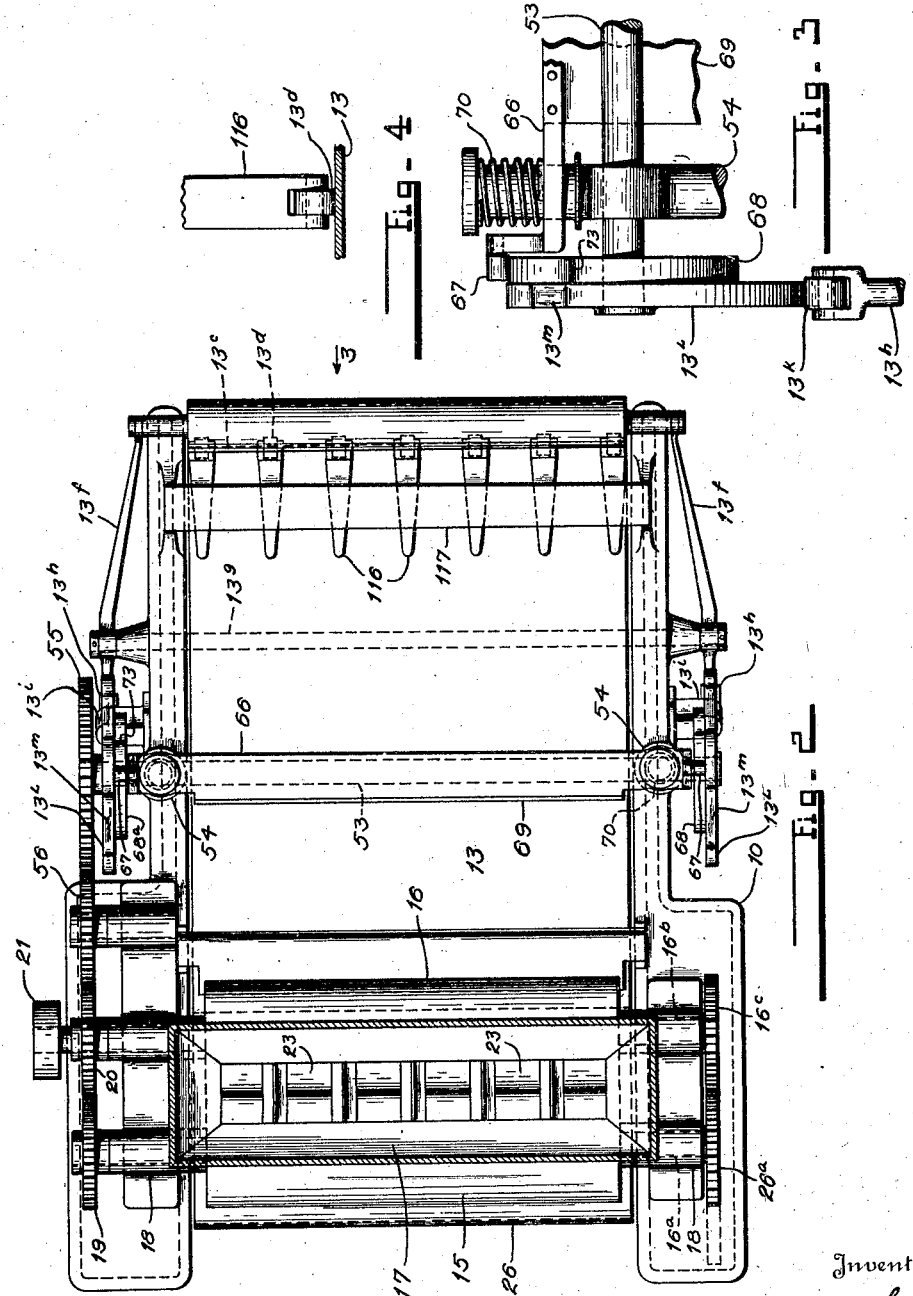

Oct. 11, 1927.

S. H. PERKY 1,645,155

MACHINE FOR FORMING A FOOD PRODUCT

Filed July 11, 1922     3 Sheets-Sheet 3

Inventor
Scott H. Perky
By John W. Searley.
Attorney

Patented Oct. 11, 1927.

1,645,155

UNITED STATES PATENT OFFICE.

SCOTT H. PERKY, OF RUMSON, NEW JERSEY.

MACHINE FOR FORMING A FOOD PRODUCT.

Application filed July 11, 1922. Serial No. 574,244.

My invention relates to machines for forming a food product.

Among the objects of my invention are:—

To provide a machine for forming a food product consisting of material prepared in the form of a ribbon and afterwards rolled into a cylinder.

To provide a machine for forming a food product having a delivery belt which will serve the two-fold purpose of forming the product and afterward, delivering the same in a completed state.

These and other objects of my invention will be set forth in the following specification, reference being had to the accompanying drawings, and the means by which these are effectuated will be definitely pointed out in the claims.

In the drawings:—

Figure 1 is a side view of my improved machine.

Fig. 2 is a view of the machine shown in Fig. 1 looking in the direction of the arrow 2 in said figure.

Fig. 3 is an enlarged view of some of the parts shown in Fig. 2 looking in the direction of the arrow 3 in said figure.

Fig. 4 is an enlarged detail view of the belt 13 and one of the wheels for guiding same.

Fig. 9 is an enlarged detail of parts hereinafter referred to.

In the drawings:—

Figure 5:
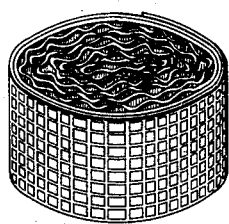
Figs. 5, 6 and 7 are views of various forms of product that may be produced by the operation of my improved machine.

10 represents a frame which may be provided with any number of supporting legs, one of which is shown at 11, by means of which the machine is supported upon the foundation 12.

13 is a belt which is operated in such a manner that it acts to both form the food product and to deliver the same.

The first operation in the production of my improved food product is to prepare the raw material in the form of a ribbon and the means for forming the ribbon from the raw material may be arranged in any desired way. The means illustrated in the drawings for forming the ribbon will now be described.

17 is a hopper into which is introduced the raw material. Before the introduction of the raw material within the hopper 17, it may be prepared in any approved manner, as for instance, if wheat is the raw material, the whole grains are to be cleaned and afterwards, steamed or boiled until any desired softness has been obtained. The raw material is introduced within the hopper 17 and carried by gravity between the rolls 15 and 16; the latter are provided upon their ends with pintles $16^a$ and $16^b$ which are revolubly mounted in bearings such as 18 that are supported upon the frame 10 in any approved manner. If desired, the bearings 18 at the corresponding ends of the rolls 15 and 16 may be arranged so that the distance between same can be varied. This is a usual expedient in the art for adjusting the distances between surfaces of rolls and is not, therefore, shown in detail.

Upon the pintle at one end of the roll 15 there is secured the gear 19 and a similar gear 20 meshing with the gear 19 is secured upon the pintle of the roll 16. A pulley 21 is secured upon the pintle of the roll 16.

Power is to be applied to the pulley 21 by a belt and when said power is applied the revolution of the rolls 15 and 16 compresses the grain and delivers the same in the form of a plurality of ribbons such as 22 upon the belt 13.

The grain as it passes through the lower portion of the hopper 17 is divided into a plurality of sections such as 23 by partitions in order that it may emerge from between the rolls in the form of a plurality of ribbons.

As a ribbon 22 contacts with the delivery belt 13 it is carried by the latter in the direction of the arrow 24 until its free end touches the upturned portion $13^a$ of the belt 13. The portion $13^a$ moves in the direction of the arrow 25 and it carries the end of the ribbon 22 upwardly, thus beginning the process of rolling said ribbon into cylindrical form.

Figure 6:
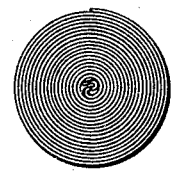

The belt 13 may have a constant linear velocity approximately equal to the constant linear velocity with which the ribbons 22 emerge from between the rolls 15 and 16. In this case the product would consist of a flat ribbon rolled into cylindrical form as shown in Fig. 6.

Figure 7:

The belt 13, however, may have a constant linear velocity less than the approximately constant linear velocity with which the ribbons 22 emerge from between the rolls 15 and 16. In this case the product would consist of a folded ribbon rolled into cylindrical form as shown in Fig. 7.

If the machine is to be constructed so that the belt 13 has an approximately constant linear velocity either equal to or less than the approximately constant linear velocity with which the ribbons 22 emerge from between the rolls 15 and 16, then the belt 13 may be driven by any form of gearing for transmitting the power from a pintle of the roll 16 to a pintle of the delivery drum 26, as for instance, by the gears $16^c$ and $26^a$. If it is desired to drive the belt $13^a$ at periodically varying linear speeds in order that the ribbon 22 may be corrugated as shown in Fig. 5, then the driving mechanism between the roll 16 and drum 26 may be such as is shown in my copending application for Letters Patent, S. N. 453,584, filed March 19, 1921, in which case the means shown for controlling the variations of the linear velocity set forth in said application would also be used.

The belt 13 is driven by the drum 26 and is kept taut by the idler drum 27. The drum 26 is revolubly supported upon the frame 10 in any approved manner.

As the ribbons 22 are carried along upon the belt 13, it is necessary to sever them into sections. The severing operation may be performed before the leading end of each ribbon reaches the portion $13^a$ of the belt 13, or it may be severed after said end has reached said portion and any desired number of convolutions of the ribbons have been made, as hereinafter explained.

In any case the severing means about to be described will be operated in any approved manner by suitable timing mechanism.

The severing mechanism will now be described:—

The shaft 53 is revolubly mounted in bearings provided in the pillars 54—54.

The gear 55 is secured upon the shaft 53 and meshes with the gear 56 which is revolubly mounted upon the stub shaft 57 and meshes with the gear 20.

The tops of the pillars 54 are cylindrical and the cross bar 66 is slidably mounted thereupon.

The rollers 67—67 are mounted upon the ends of the cross bar 66 and rest upon the guiding cams 68 and $68^a$ which are rigidly mounted upon the shaft 53.

The cutter 69 is secured to the cross bar 66 and extends the full width of the belt 13. Springs 70—70 are mounted upon the cylindrical portion of the pillars 54 and serve to keep the rollers 67—67 pressed against the cams 68 and $68^a$.

Figure 8:
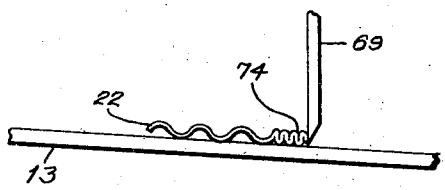
Fig. 8 shows a stage in the formation of the product of my improved machine.

When the revolution of the shaft 53 brings the notch 73 under the roller 67, the springs 70—70 force the cutters 69 into contact with the belt 13 as shown in Fig. 8. The beginning of the notch 73 is so located that the cutter 69 severs the ribbons 22 at the proper time and said notch is of sufficient length to permit of the cutters 69 remaining in contact with the belt 13 for a sufficient period to compact a portion of the ribbons as shown at 74 in Fig. 8, if desired. If it is not desired to compact the leading end of the ribbon as shown at 74, the notch 73 is made of sufficient length to permit the springs 70—70 to force the cutter 69 into contact with the belt 13 for but an instant in order to sever the ribbons 22.

The next operation in forming my improved product is that of rolling the ribbons into cylindrical shape, and the means by which this operation is performed will now be described.

Figure 9:
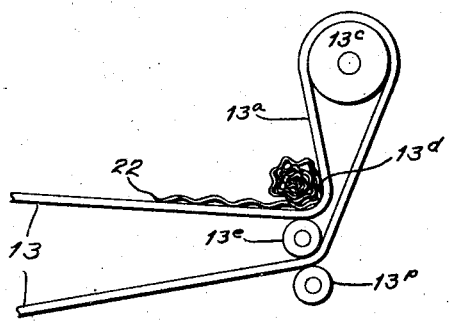

When the compacted portion 74 of the ribbons, or the leading end of the ribbons if same is not compacted, reaches the portion $13^a$ of the belt 13, the portion 74 or the leading end of the ribbons are moved upwardly in the direction of the arrow 25. At the same time the bodies of the ribbons 22 are being moved in the direction of the arrow 24 and from these movements it results that the ribbon 22 is rolled as shown in Fig. 9 until the cylinders formed of the ribbons 22 become of the predetermined diameter.

In order to keep the cylinders in proper location while being rolled, septa such as 116 are provided. These septa are secured to the strut 117 and the latter is secured to the frame 10 of the machine. After the cylinders are rolled as just described, it is necessary to remove them from between the septa 116 and the means by which this is accomplished will now be described.

The belt $13^a$ passes over the delivery drum $13^c$ and when said belt is in the position shown by full lines in Fig. 1, it is bent around the wheels $13^d$ of which one is revolubly secured in each of the septa 116. Said belt is also bent around the idler drum $13^e$ which is revolubly mounted in the frame of the machine.

The drum $13^c$ is revolubly mounted in the levers $13^f$, the latter being pivoted to the shaft $13^g$ which is revolubly mounted in the framework of the machine.

The follower bars $13^h$ (slidably mounted in the guide $13^i$) are each pivotally connected to the levers $13^f$ and are provided with a follower roller $13^k$ which bears against the cam $13^l$. The cam $13^l$ is cut away as at $13^m$ in order that the weight of the drum $13^c$ and the force of the spring $13^o$ may move said drum from the position shown by full lines in Fig. 1 to the position shown dotted in said figure in order to deliver the cylinders from between the septa 116 to the off bearing belt 204.

When the drum $13^c$ is moved to the position shown dotted in Fig. 1, the belt 13 is guided by the idler drum 13ᵉ just described and by the idler drum 13ᵖ which is revolubly mounted in the frame of the machine.

The belt 204 may deliver the rolled cylinders to a drying or baking oven or to packing mechanism, or to any other desired machinery. For certain purposes, the belt 204 may be dispensed with and the rolled cylinders delivered into the hands of the operator.

It is to be understood that the belt 204 moves in the direction of the arrow 24.

While I have shown one preferred embodiment of my improved machine, it is to be understood that I do not limit myself to the exact construction there shown, for many changes may be made therein in order to render it suitable for use in making other products than those suitable for food, and for other purposes, without departing from the spirit of my invention.

I claim:—

1. In a machine for making food products, the combination with means for receiving the raw material and means for forming said material into a ribbon, of a belt for receiving said ribbon, means for disposing said belt to obtain cooperating divergent portions thereof for rolling said ribbon into the form of a cylinder, said belt disposition being maintained during the rolling operation, and means for moving said belt to deliver said cylinder.

2. In a machine for making food products, the combination with means for receiving the raw material and means for forming said material into a ribbon, of a belt for receiving said ribbon, means for periodically guiding said belt to obtain cooperating divergent portions thereof for rolling said ribbon into the form of a cylinder, said belt arrangement being maintained during the rolling operation, and means for periodically guiding said belt to deliver said cylinder.

3. In a machine for making food products, the combination with means for receiving the raw material and means for forming said material into a ribbon, of a belt, a delivery drum for guiding said belt, and means for moving said drum to obtain cooperating divergent portions thereof to roll said ribbon into the form of a cylinder and to another position for delivering said cylinder, the first position of said drum being maintained during the rolling operation.

4. In a machine for making food products, the combination with means for receiving the raw material and means for forming said material into a plurality of ribbons, septa for dividing said ribbons, a belt for rolling said ribbons into the form of a cylinder and wheels in said septa for guiding said belt.

5. In a machine for making food products, the combination with means for receiving the raw material and means for forming said material into a plurality of ribbons, septa for dividing said ribbons, a belt for rolling said ribbons into the form of a cylinder, wheels in said septa and rollers for guiding said belt.

6. In a machine for making food products, the combination with means for receiving the raw material and means for forming said material into a ribbon, of means for severing said ribbon, cams for operating said means, a belt movable to positions for forming said ribbon into a cylinder and for delivering said cylinder, and cams for moving said belt.

7. In a machine for making food products, the combination with means for receiving the raw material and means for forming said material into a ribbon, of a belt for receiving said ribbon, a movable drum disposed at the delivery end of said belt for guiding the same, means for moving said drum to form a pocket having divergent sides on the reception side of said belt to roll said ribbon into the form of a cylinder, the shape of said pocket being maintained during the rolling operation, and means for withdrawing said drum to deliver said cylinder.

8. In a machine for making food products, the combination with means for receiving the raw material and means for forming said material into a plurality of ribbons, of a belt for receiving said ribbons, septa for dividing said ribbons, a movable drum disposed at the delivery end of said belt for guiding the same, means for moving said drum to form a plurality of pockets having divergent sides with said septa to roll said ribbons into the form of cylinders, and means for withdrawing said drum to deliver said cylinders.

9. In a machine for making food products, the combination with means for receiving the raw material and means for forming said material into a ribbon, of a belt for receiving said ribbon, means for periodically guiding said belt to obtain cooperating portions thereof arranged in the manner of an acute angle for rolling said ribbon into the form of a cylinder, and means for periodically guiding said belt to deliver said cylinder.

10. In a machine for making food products, the combination with means for receiving the raw material and means for forming said material into a ribbon, of a belt adapted at one end for receiving said ribbon and arranged at the opposite end to obtain cooperating divergent portions thereof for rolling said ribbon into the form of a cylinder, said divergent relation being maintained during the rolling operation.

In testimony whereof, I affix my signature.

SCOTT H. PERKY.